United States Patent [19]
Bennett

[11] 3,950,573
[45] Apr. 13, 1976

[54] METHOD FOR MAKING SEALING TAPES
[75] Inventor: William E. Bennett, Dallas, Tex.
[73] Assignee: Hardcast, Inc., Dallas, Tex.
[22] Filed: Dec. 11, 1974
[21] Appl. No.: 531,540

Related U.S. Application Data
[62] Division of Ser. No. 363,583, May 24, 1973, abandoned.

[52] U.S. Cl. ................ 427/208; 427/211; 427/356; 427/358; 427/428; 118/124; 118/244; 428/346
[51] Int. Cl.² .......................................... B44D 1/44
[58] Field of Search .......... 427/356, 358, 428, 211, 427/208; 118/56, 67, 261, 68, 124

[56] References Cited
UNITED STATES PATENTS
1,944,835   1/1934   Boyers ............................... 427/211
2,117,432   5/1938   Linscott ............................. 427/358
3,679,456   7/1972   Young ................................ 427/207

Primary Examiner—Ralph S. Kendall
Attorney, Agent, or Firm—Jack A. Kanz

[57] ABSTRACT

Disclosed is a sealing tape comprising a fabric medium impregnated with a plaster and adhesive slurry which is activated upon immersion in an adhesive-containing solution. The activated tape is used to join and seal joints of conduit and to encase insulated conduit. Methods and apparatus for making the tape are also disclosed.

3 Claims, 1 Drawing Figure

U.S. Patent   April 13, 1976   3,950,573
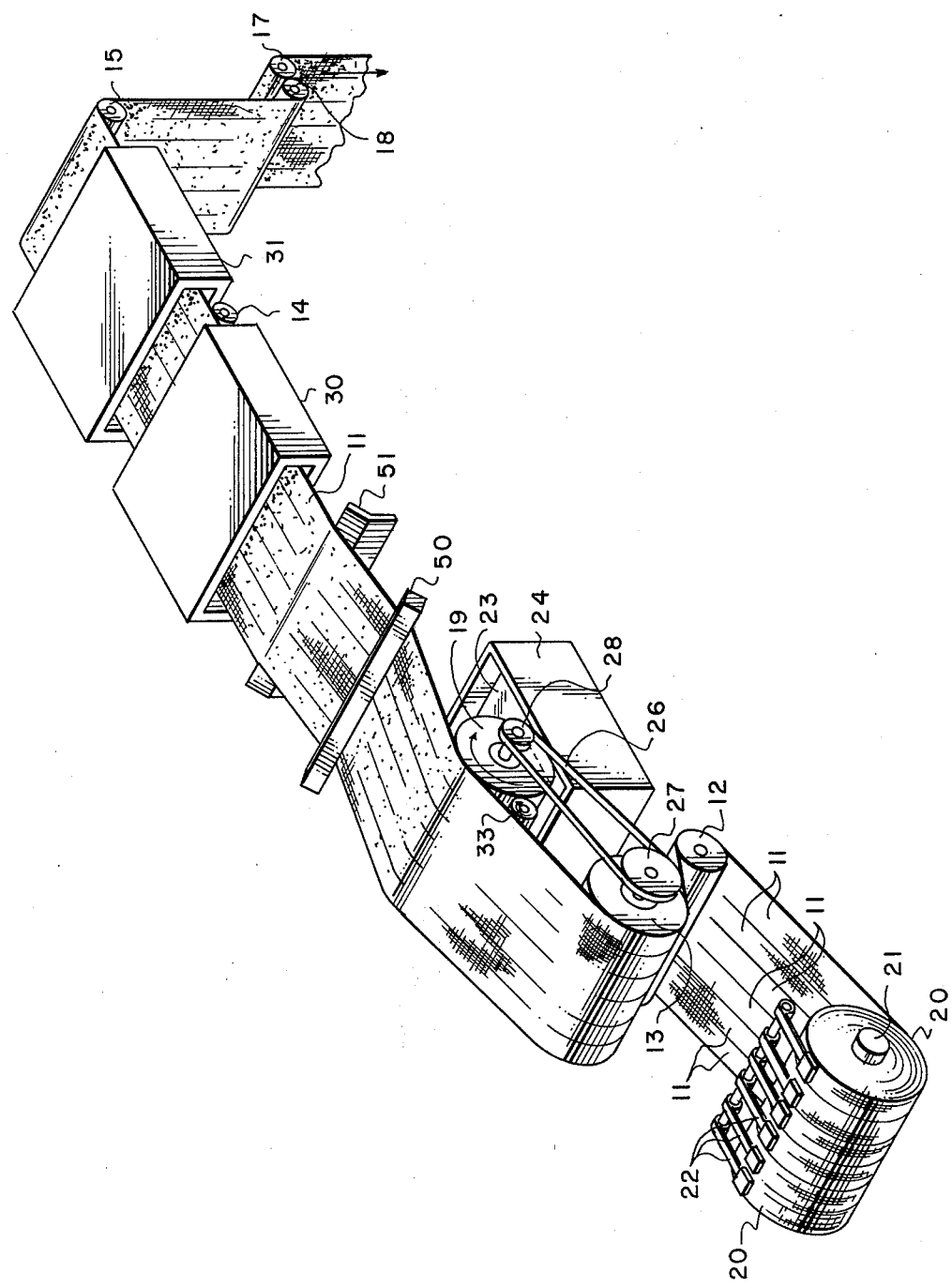

METHOD FOR MAKING SEALING TAPES

This application is a division of co-pending application of William E. Bennett entitled "Method and Apparatus for Making Sealing Tape", Ser. No. 363,583, filed May 24, 1973, now abandoned.

This invention relates to adhesive sealing materials. More particularly this invention relates to methods for producing materials for joining and sealing joints of duct work made of metal, plastic, cement, asbestos, fiber or other materials.

In the construction industry sections of conduit materials, fabricated from metal or other materials such as asbestos, cement, plastics and the like, are commonly joined to form ducts or conduits for conducting air, water and other fluids. The sections are usually joined by inserting one end of one section within the end of another section or by placing the ends of the sections in abutting relationship and the junction effectively sealed by wrapping adhesive tape around the junction. However, adhesive tapes normally used for this purpose do not adhere well to dirty or oily surfaces and are generally subject to decay. Such adhesive materials tend to lose their adhesive quality after long exposure to varied temperatures and therefore effective sealing of the junction is lost. Furthermore, conventional adhesive tapes do not adhere well to all materials. Accordingly, the sealing tape used must be carefully selected to match the conduit material used, and extreme care must be taken to insure that the surface to which the tape is applied is free of foreign material.

Frequently such duct work must be insulated to minimize thermal changes in the fluid being conducted therethrough. The material used for providing such insulation generally must be applied after the sections are joined and installed. The sealing tape must generally be impervious to water vapor, air, or other fluids which may be conducted through the conduit or to which the joint may otherwise be exposed.

U.S. Pat. No. 3,679,456 to Chester C. Young discloses a plaster and adhesive impregnated gauze strip which may be activated by immersion in a suitable activating solution and then applied to a conduit or the like to provide sealing of junctions. The tape material is supplied in dry flexible form which is then activated by immersion in an adhesivecontaining activating solution. Upon activation the tape is applied to the desired location and forms a tenacious bond to all conventional conduit material. The tape bonds extremely well to dirty, oily or greasy surfaces, is resistant to most corrosive agents, and resists aging and deterioration, thereby sealing the junction to which it is applied while bonding the conduit sections together.

The tape may be advantageously used by unskilled workmen under most adverse conditions and quickly hardens to provide a hard, semi-rigid, air-tight, weatherproof and lasting adhesive seal.

In accordance with the process disclosed in the above-mentioned U.S. Pat. No. 3,679,456 the plaster slurry is placed onto a moving strip of fabric by a transfer roll which rotates in a slurry tank and contacts the underside of the fabric strip. The strip thereby becomes impregnated with the slurry and is thereafter dried. Unfortunately, as the slurry dries on the strip, the slurry contracts leaving holes in the dry plasterimpregnated tape.

Since the tape in dry form has holes therein, a plurality of layers of tape are frequently required to form an airtight seal.

In accordance with the present invention the tape fabricating apparatus is provided with means for kneading or smoothing the wet slurry to provide a uniformly distributed layer on both sides of the fabric before the slurry is dried. Thereafter the slurry is dried on the fabric and forms a uniform dry coating which is free of voids and holes. The smooth, void-free tape may then be immersed in the activating solution and applied as desired. Since the tape is free of voids and holes, a single layer thereof hardens to form an airtight seal. Other features and advantages of the invention will become more readily understood when taken in connection with the appended claims and attached drawing in which the sole figure is a schematic illustration of apparatus for practicing the preferred forms of the invention.

In the preferred embodiment of the invention, a gauze fabric is impregnated with a gypsum base slurry which is then dried to form a plaster bearing gauze tape. The gauze fabric may be any suitable loosely woven fabric such as cotton, synthetic fiber or the like.

The plaster is impregnated into and coated onto the fabric according to the method which will be described hereinafter. The plaster slurry is preferably comprised of a mixture of water, methyl alcohol, gypsum powder, a homopolymer adhesive emulsion and a substituted methyl ether of cellulose. Table I below illustrates the proportions of each component used in the preferred embodiment of the invention.

TABLE I

| Component: | Parts by Weight |
| --- | --- |
| Methyl alcohol | 75 |
| Water | 200 |
| Cellulose ether | 2 |
| Homopolymer adhesive | 10 |
| Gypsum powder | 500 |

Referring now to the drawing, the method and apparatus used for impregnating the gauze strip with the slurry will be described. Gauze strips 11, in convenient widths, such as three to six inches are drawn from supply rolls 20 over tension rolls 12, 13, 14 and 15 by draft rolls 17 and 18.

Draft rolls 17 and 18 are positioned on opposite sides of strips 11 and are pressed firmly together. Rotation of draft rolls by a power source (not shown) draws strips 11 through the entire apparatus. Finished strips 11 emerging from draft rolls 17 and 18 may be folded or rolled in lengths suitable for use.

Gauze strips 11 are supplied from individual rolls 20 which are freely carried on fixed spindle 21. Weighted shoes 22 ride on each of rolls 20 to cause slight resistance to rotation and provide tension on each individual strip 11 between supply rolls 20 and draft rolls 17 and 18. Sufficient tension should be maintained on each strip to support the strips between transfer roll 19 and tension roll 14, and between rolls 14 and 15.

The plaster slurry 23 is placed in slurry trough 24. Mounted for rotation within trough 24 is a transfer roll 19. Roll 19 preferably has a smooth surface and is mounted so that the lower portion of the roll is submerged in the slurry 23 and the top portion of the roll contacts the underside of strips 11. As transfer roll 19 rotates in slurry 23, the plaster slurry adhers to the surface thereof and is transferred to the underside of strips 11 as strips 11 pass over the surface of the transfer roll.

Tension roll 13 preferably has a roughened surface of soft rubber or the like so that the roll 13 is rotated by drawing strips 11 thereover. Roll 19 is mechanically linked with and driven by roll 13 by means of drive belt 26 interconnecting pulleys 27 and 28.

Rolls 13 and 19 are adapted to rotate at different speeds by means of pulleys 27 and 28 mounted on rolls 13 and 19, respectively. In the preferred embodiment rolls 13 and 19 have approximately the same circumference, but the circumference of pulley 27 is about one and onehalf times the circumference of pulley 28. Accordingly, rolls 13 and 19 rotate at a ratio of about 1:1.5.

Since transfer roll 19 rotates faster than roll 13 (which rotates at the speed of moving strips 11) slurry adhering to the surface of transfer roll 19 is transferred from the surface of the roll 19 to the underside of strips 11. Each strip passes over the surface of the transfer roll 19 and wipes the slurry from the transfer roll onto the underside of the strip to form a wet plaster coating on the strips.

Since the top of transfer roll 19 is above a line connecting the tops of tension rolls 13 and 14, the strips 11 are held firmly against the top of the transfer roll 19 as they pass thereover. The surface of the transfer roll moves faster than the strips 11, therefore slurry adhering to the transfer roll 19 is pressed partially through the weave in the fabric to impregnate the fabric with slurry.

The amount of slurry transferred to the strips 11 by transfer roll 19 is governed by a meter roll 33 which is positioned parallel to and spaced from transfer roll 19 on the ascending side thereof. Meter roll 33 does not contact the strips 11 and is powered by a power source (not shown) to rotate in a direction opposite to the transfer roll. Meter roll 33 may be provided with a suitable wiper to remove slurry therefrom, or may only be rotated occasionally to prevent build-up of slurry on the face thereof opposite the transfer roll 19.

Transfer roll 19 is preferably a steel roll with a smooth coating of neoprene rubber or the like to which the slurry adheres. Meter roll 33 preferably has a highly polished chrome steel surface to which the slurry does not adhere. Therefore, as the ascending side of the transfer roll 19 emerges from the slurry 23, a thick viscous coating of slurry adheres to the roll and is raised toward the strips 11. Meter roll 33 is spaced from the surface of roll 19 and meters the thickness of the slurry to a reduced uniform thickness before the slurry contacts the strips 11. It will be apparent, therefore, that the amount of the coating placed on strips 11 can be controlled by the separation between meter roll 33 and transfer roll 19 and the speed of the surface of transfer roll 19 relative to strips 11.

Using the apparatus described above with the slurry composition set forth in Table I meter roll 33 is spaced approximately 1/16 inch from the surface of transfer roll, thereby limiting the thickness of slurry coating on the transfer roll which contacts the strips 11 to about 1/16 inch. Since the slurry does not adhere to the meter roll, slurry removed from the transfer roll by the meter roll falls back into the slurry trough 24.

In accordance with the present invention means are provided for kneading or smoothing the slurry into the gauze strip to evenly distribute the slurry on both sides and throughout the weave of the gauze. The preferred means for performing this function is illustrated in the drawing as a pair of wipers 50 and 51 positioned on opposite sides of the gauze strip between the transfer roll and the drying oven.

It will be observed that as the slurry is transferred to the gauze by the transfer roll 19 the slurry is forced through the weave of the gauze and is carried partially on the top side of the strip. Because the slurry is forced through the weave it emerges on the top side as a rather nonuniform deposit. When dried in this condition bubbles are formed within the slurry deposit which form holes in the dried composition. As illustrated in the drawing a wiper bar 50 is positioned above the tape strip 11. The bar 50 is positioned parallel to and approximately 10 to 12 inches from the transfer roll 19. Wiper bar 50 is preferably a square or triangular bar with rounded corners and positioned so that one corner contacts the top of the strips 11. The wiper bar 50 need exert only slight amount of pressure on the strip itself. In the preferred embodiment the bar is lowered to contact the top side of the strip 11 and depress the strips 11 from their normal course by a slight amount, preferably a deviation of about 10° from horizontal.

A second wiper bar 51 is positioned on the opposite side of the strips parallel to and approximately 4 to 8 inches from the first wiper bar 50. In the preferred embodiment the second wiper 51 is a metal plate or sheet which intersects the strips 11 at angle of about 45° to about 60°. Sufficient pressure is exerted on the underside of the strips 11 by wiper 51 to cause an upward deviation of strips from their normal course of about 5° to 10°.

It will thus be observed that as the strip passes over the transfer roll 19 the slurry is pushed through the weave and rides primarily on the top side of strips 11. The first wiper bar 50 serves to smooth the slurry and evenly distribute it over the top surface of the strip. Furthermore, the bar 50 causes a major portion of the slurry to be forced back through the gauze and be suspended on the lower side thereof. As the gauze moves over the second wiper bar 51 the slurry is again pushed partially through the gauze to the top side thereof resulting in a uniformly distributed layer of slurry on both top and bottom sides of the gauze.

It should be noted that the wiper bars 50 and 51 do not remove excess slurry from the strip. The wiper bars serve mainly to knead the slurry into the gauze and remove air bubbles therefrom. Accordingly, when the strip 11 enters the first drying oven 20 the slurry is evenly distributed throughout the weave of the gauze and forms a uniform solid coating of slurry on the gauze strips.

The strips 11 carrying slurry transferred from transfer roll 19 are then drawn directly into an oven 30 and are partially dried as they pass therethrough. The strips are then withdrawn from oven 30 over tension roll 14 and into oven 31 for final drying. The dried strips are then drawn over tension roll 15 and through draft rolls 17 and 18. The strips 11 emerge from the second drying oven 31 in a completely dry state and are uniformly coated with a dry plaster which is relatively smooth on both sides and free of holes.

In the preferred embodiment of the invention, gauze strips 11 are drawn through the apparatus shown in the drawing at a rate of about five yards per minute. Ovens 30 and 31 are each about twenty feet long and open at both ends so that gauze strips 11 may be drawn straight through the ovens without physically contacting the oven. Dry heated air is continuously passed through the first oven 30 to maintain the temperature therein at a relatively constant temperature of approximately 700°F. Likewise dry heated air is continuously passed through the second oven 31 to maintain the temperature within the oven at approximately 400°F. Dry heated air may be suppled by any conventional source (not shown) such as electric heaters or the like. Strips 11 emerge from the second oven 31 in essentially dry state and are ready for use.

The plaster and adhesive impregnated gauze prepared as described above is similar in appearance (excepting color) to plaster of paris gauze tape generally used for orthopedic purposes. However, the tape prepared as above is quite different from general orthopedic gauze tapes in that it includes a specific adhesive which is later activated by immersion in a solution to be described hereinafter.

The plaster and adhesive impregnated tape produced in accordance with the invention is activated for use by immersion in a solution comprising trichloroethylene, methyl alcohol and an adhesive emulsion copolymer of vinyl acetate and a long chain acrylate. The preferred copolymer adhesive used for the activating solution is an emulsion available commercially under the trade name Gelva Emulsion TS-100 from the Monsanto Company of St. Louis, Missouri. Table II below illustrates the portions of each component used in the activating solution in the preferred embodiment of the invention.

TABLE II

| Component | Percent by volume |
|---|---|
| Ethyl alcohol | 12.5 |
| Trichloroethylene | 2.67 |
| Copolymer adhesive | 84.82 |

The activating solution is prepared by merely mixing the above components in the proportions shown. The solution may be stored indefinitely and is immediately ready for use.

The activating solution described is advantageously adapted to permit use thereof under widely varied ambient temperature conditions. This solution has a freezing point of about 10°F and dries quickly while forming a uniform adhesive film even at low temperatures.

The plaster and adhesive impregnated gauze strips produced as described above may be used for adjoining and sealing conduit joints and the like by immersing a roll of the gauze strip in the activating solution and then immediately applying the gauze to the joint to be sealed. No special skill is involved in applying the activating solution to the gauze strip or in applying the strip to the conduit. The tape may be wetted by brush application of the activating solution to one face of the tape and the wetted face applied to juncture of conduit. Since the plaster and adhesive is uniformly distributed throughout the gauze and on both sides thereof, a single wrapping of the wetted tape is sufficient to form an airtight seal. However, where the tape is used for structural joining of joints of pipe or the like, the tape should, of course, be wrapped around the conduit on both sides of the junction for a sufficient distance to provide rigidity to the finished conduit after the tape has cured. The number of layers of wrapping required will vary with the size and type of conduit being joined.

The tape drys rapidly to form a non-rewettable ceramic-like mass. The set tape, however, is quite different from conventional plaster of paris tapes in that the sealing material produced as described above sets up to form a semi-rigid structure tenaciously bonded to the conduit. Although the material drys to a cermaic-like hard structure, the sealing material is somewhat resilient and will allow normal expansion and contraction of the conduit without fracturing. While drying time is dependent upon temperature and humidity conditions existing on the job site, the product formed as described above is completely dry or set within 2 hours under normal conditions.

While the precise chemical process involved in not fully understood, it is believed that a chemical reaction takes place involving the homopolymer adhesive and the copolymer adhesive when the plaster and adhesive impregnated tape is immersed in the activating solution. This reaction is believed to be at least partially responsible for the formation of the hard semi-rigid mass produced and for the formation of the tenacious bond to the base material.

After drying the sealing tape is quite smooth in appearance. The seal is resistant to most corrosive agents, resists aging, forms an effective vapor barrier, and adheres extremely well to all conventional conduit materials.

The product produced as described above may be conveniently used by unskilled workmen to seal joints of any conventional conduit material. Thorough cleaning of the surface of the conduit material is not necessary since the sealing tape adheres extremely well to even oily or greasy surfaces.

Coloring agents may be added to the slurry used to form the tape of the invention if desired. For example, it has been discovered that by adding lamp black to the slurry used in forming the tape of this invention in the proportion of approximately 6 ounces of lamp black for each 100 pounds of slurry, the resultant tape will have a metallic grey appearance. It will be apparent to those skilled in the art that other coloring agents which do not disadvantageously interfere with the reactions involved in setting up the materials may be added to the slurry to produce the desired coloring effect.

The tape products described above may be made especially fire retardant by incorporating fire retarding materials in the activating solution. Care must be exercised in selecting a fire retarding agent which does not disadvantageously interfere with the properties of the other ingredients or interfere with the bonding properties of the tape.

Tapes having fire retardant qualities can be produced by adding a phosphorous-based fire retardant to the activating solution described above with reference to Table II. In the preferred embodiment, a dry powder fire retardant containing about 70% $P_2O_5$ by weight is added directly to the activating solution. An ammonium polyphosphate powder sold commercially under the trademark Phos-Chek P/30 by The Monsanto Company of St. Louis, Missouri has been found suitable for this purpose. This composition is preferably added in proportions of about 2.5 pounds per gallon of solution. This fire retardant is dissolved in the solution and is thereby incorporated into the sealing tape when the dry tape is activated.

While the invention has been described with particular reference to specific embodiment thereof, it will be understood that the forms of the invention shown and described in detail are to be taken as preferred embodiments of same, and that various changes and modifications may be resorted to without departing from the spirit and scope of the invention as defined by the appended claims.

What is claimed is:

1. In the method of coating a gauze fabric strip with paster wherein a plaster slurry is transferred from a slurry reservoir to a fabric strip by a transfer roll rotating in contact with the underside of said fabric strip and the plaster slurry in the reservoir and said fabric strip is thereafter drawn through drying means, the improvement comprising:
   a. drawing the top surface of said fabric strip across a first wiper positioned between said transfer roll and said drying means to force a substantial portion of the slurry on the top side of said fabric strip through said fabric strip, and
   b. drawing the bottom surface of said fabric strip across a second wiper means positioned between said first wiper means and said drying means to at least partially force said slurry on the lower side of said fabric strip through said fabric strip.

2. The improvement set forth in claim 1 wherein said transfer roll is rotated with its surface traveling the same direction as said fabric strip and including the step of metering the amount of slurry transferred to said strip to a predetermined amount sufficient to form a coating of slurry on said strip of the desired thickness.

3. The improvement set forth in claim 1 including the step of positioning said first and second wiper means to only re-distribute slurry deposited on said strip without removing slurry from said strip.

* * * * *